United States Patent
Newman et al.

(10) Patent No.: US 10,477,076 B1
(45) Date of Patent: Nov. 12, 2019

(54) SYSTEMS AND METHODS FOR SYNCHRONIZING VISUAL CONTENT

(71) Applicant: GoPro, Inc., San Mateo, CA (US)

(72) Inventors: David Newman, San Diego, CA (US); Gregory Oaul Stewart, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 16/131,505

(22) Filed: Sep. 14, 2018

(51) Int. Cl.
*H04N 5/073* (2006.01)

(52) U.S. Cl.
CPC ................. *H04N 5/0733* (2013.01)

(58) Field of Classification Search
None
See application file for complete search history.

(56) References Cited

U.S. PATENT DOCUMENTS

2015/0256720 A1* 9/2015 Yakay ............. H04N 5/247 348/522
2017/0324950 A1* 11/2017 Du ................. H04N 5/2254

* cited by examiner

*Primary Examiner* — Samira Monshi
(74) *Attorney, Agent, or Firm* — Esplin & Associates, PC (57) ABSTRACT

Multiple image capture devices may individually generate time information and capture images. Individual image captures devices may receive time information of other image capture device(s). Individual image capture devices may transmit its time information to other image capture device(s) independent of reception of the time information of other image capture device(s). Individual image capture devices may generate time synchronization information for the captured images based on its time information and the received time information of other image capture device(s). Images captured by different image capture devices may be time-synchronized based on at least one of generated time-synchronization information.

15 Claims, 5 Drawing Sheets

SYSTEMS AND METHODS FOR SYNCHRONIZING VISUAL CONTENT

FIELD

This disclosure relates to systems and methods for visual content captured by multiple image capture devices based on transmission of time information of the multiple image capture devices.

BACKGROUND

Multiple image capture devices may capture visual content (images, videos) for a single event and/or related events. Manually synchronizing the visual content captured by the multiple image capture devices may be difficult and/or time consuming.

SUMMARY

This disclosure relates to synchronizing visual content. Multiple image capture devices may individually include an optical element, an image sensor, a clock, a transmitter, and a receiver. The optical element may guide light within a field of view to the image sensor. The image sensor may generate image output signals based on light that becomes incident thereon. The image output signals may convey image information that defines images. The clock may provide time information of a respective image capture device. Individual image capture devices may receive time information of other image capture device(s) using the receiver, and transmit the time information of the respective image capture device using the transmitter independent of reception of the time information of other image capture device(s). Individual image capture devices may capture a set of images during a capture duration based on the image output signals, and generate time synchronization information for the set of images based on the time information of the respective individual image capture device, the time information of the other image capture device(s), and/or other information. Multiple images from captured sets of images may be time-synchronized based on at least one of generated time-synchronization information.

An image capture device may include one or more of an optical element, an image sensor, a clock, a transmitter, a receiver, a processor, and/or other components. The optical element may be configured to guide light within a field of view to the image sensor. The image sensor may be configured to generate image output signals based on light that becomes incident thereon. The image output signals may convey image information that defines images. The clock may be configured to provide time information of a respective image capture device. The transmitter may be configured to transmit information. The receiver may be configured to receive information.

The processor(s) of the image capture device may be configured by machine-readable instructions. Executing the machine-readable instructions may cause the processor(s) to facilitate synchronization of visual content. The machine-readable instructions may include one or more computer program components. The computer program components may include one or more of a reception component, a transmission component, a capture component, a synchronization component, and/or other computer program components.

The reception component may be configured to receive time information of other image capture device(s) using the receiver. The reception component may receive time information of other image capture device(s) during operation of the respective image capture device to capture image(s). The reception component may receive time information of other image capture device(s) during non-operation of the respective image capture device to capture image(s).

The transmission component may be configured to transmit the time information of the respective image capture device using the transmitter. Transmission of the time information of the respective image capture device may be independent of reception of the time information of the other image capture device(s).

The capture component may be configured to capture a set of images during a capture duration based on the image output signals. The set of images may include one or more images. The image(s) may include video frames of a video.

The synchronization component may be configured to generate time synchronization information for the set of images based on the time information of the respective image capture device, the time information of the other image capture device(s), and/or other information.

The multiple image capture devices may include a first image capture device, a second image capture device, and/or other image capture device(s). Captured sets of images may include a first set of images captured by the first image capture device during a first capture duration, a second set of images captured by the second image capture device during a second capture duration, and/or other set(s) of images capture by other image capture device(s) during other capture duration(s). Generated time-synchronization information may include first time synchronization information generated by the first image capture device, second time synchronization information generated by the second image capture device, and/or other time synchronization information generated by other image capture device(s). Multiple images from the captured sets of images may be time-synchronized based on at least one of the generated time-synchronization information.

In some implementations, the multiple image capture devices may further include a third image capture device. The captured sets of images may further include a third set of images captured by the third image capture device. The generated time-synchronization information may further include third time synchronization information generated by the third image capture device.

In some implementations, the first capture duration for the first set of images may overlap with the second capture duration for the second set of images. In some implementations, the first capture duration for the first set of images may be different from the second capture duration for the second set of images.

In some implementations, time-synchronized images may be used to generate a video edit including images captured by different image capture devices. The video edit may be generated by one of the image capture devices and/or a server after the capture of the sets of images.

In some implementations, transmission of the time information by the multiple image capture devices may be staggered such that the first image capture device transmits time information of the first image capture device at a first time and the second image capture device transmits time information of the second image capture device at a second time different from the first time.

In some implementations, time information of the first image capture device may include a time of the first image capture device, an identifier of the first image capture device, and/or other information. Time information of the second image capture device may include a time of the second image capture device, an identifier of the second image capture device, and/or other information.

In some implementations, the first time synchronization information is generated by the first image capture device based on the time of the second image capture device, the identifier of the second image capture device, and/or other information. In some implementations, the first time synchronization information is generated by the first image capture device based on a difference between the time of the first image capture device and the time of the second image capture device, the identifier of the second image capture device, and/or other information.

In some implementations, an offset between the time of the first image capture device and the time of the second image capture device may be determined based on the first time synchronization information generated by the first image capture device and the second first time synchronization information generated by the second image capture device. In some implementations, the offset between the time of the first image capture device and the time of the second image capture device may be determined based on an average of a first offset indicated by the first time synchronization information and a second offset indicated by the second time synchronization information.

In some implementations, the first time synchronization information generated by the first image capture device may be stored within a metadata track of a first video. The first video may include the first set of images captured by the first image capture device.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
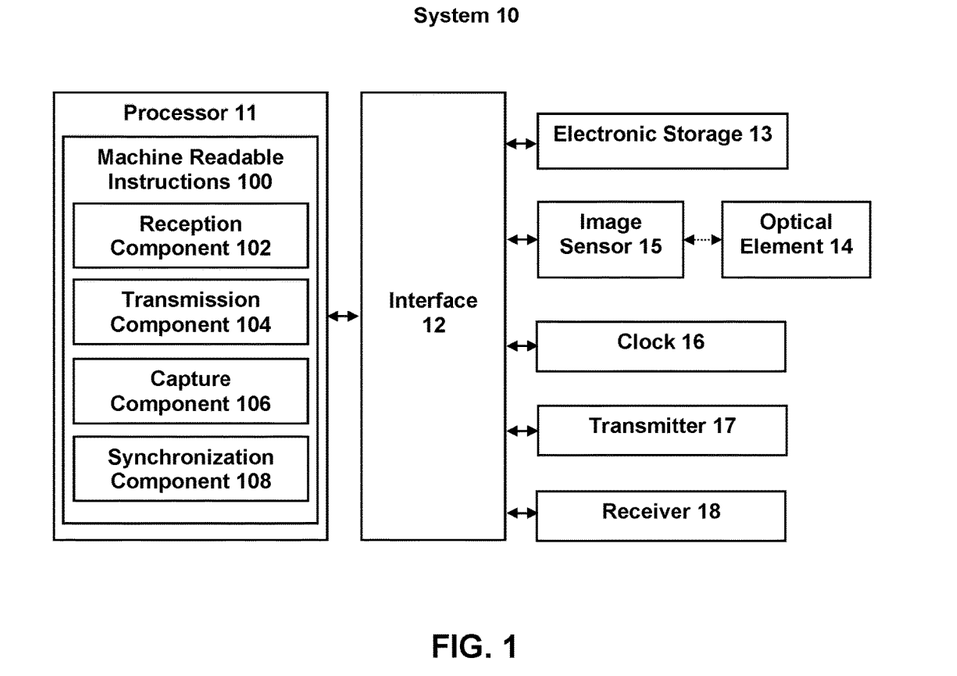
FIG. 1 illustrates a system for synchronizing visual content.

FIG. 1 illustrates system 10 for synchronizing visual content. The system 10 may include or be part of an image capture device. System 10 may include one or more of a processor 11, an interface 12 (e.g., bus, wireless interface), an electronic storage 13, an optical element 14, an image sensor 15, a clock 16, a transmitter 17, a receiver 18, and/or other components. The optical element 14 may guide light within a field of view to the image sensor 15. The image sensor 15 may generate image output signals based on light that becomes incident thereon. The image output signals may convey image information that defines images. The clock 16 may provide time information of an image capture device. The time information of the image capture device may be transmitted using the transmitter 17. Time information of other image capture device(s) may be received using the receiver 18. The transmission of the time information of the image capture device may be independent of reception of the time information of other image capture device(s). A set of images may be captured during a capture duration based on the image output signals. Time synchronization information for the set of images may be generated based on the time information of the image capture device, the time information of the other image capture device(s), and/or other information. Multiple images from sets of images captured by multiple image capture devices may be time-synchronized based on the generated time-synchronization information.

The electronic storage 13 may include electronic storage medium that electronically stores information. The electronic storage 13 may store software algorithms, information determined by processor 11, information received remotely, and/or other information that enables system 10 to function properly. For example, the electronic storage 13 may store information relating to the image sensor 15, information relating to image output signals, image information, information relating to images, clock 16, time information, time synchronization information, and/or other information.

The optical element 14 may include instrument(s), tool(s), and/or medium that acts upon light passing through the instrument(s)/tool(s)/medium. For example, the optical element 14 may include one or more of lens, mirror, prism, and/or other optical elements. The optical element 14 may affect direction, deviation, and/or path of the light passing through the optical element 14. The optical element 14 may be configured to guide light within a field of view to the image sensor 15. The field of view of the optical element 14 may refer to the extent of the observable world that is seen through the optical element 14. The field of view of the optical element 14 may include the angle (e.g., vertical angle, horizontal angle, diagonal angle) at which light is received and passed on by the optical element 14.

The image sensor 15 may include sensor(s) that converts received light into output (electrical) signals. For example, the image sensor 15 may include one or more of a charge-coupled device sensor, an active pixel sensor, a complementary metal-oxide semiconductor sensor, an N-type metal-oxide-semiconductor sensor, and/or other image sensors. The image sensor 15 may be configured to generate image output signals convey image information and/or other information. The image information may define images based on light that becomes incident on the image sensor 15.

The clock 16 may be configured to provide time information of an image capture device. The clock 16 may include a hardware clock, a software clock, and/or other clock mechanisms. An image capture device may refer to equipment used to capture one or more images. An image capture device may be a standalone device or a multi-purpose device. For example, an image capture device may include a standalone camera or a camera portion of a mobile device (e.g., camera portion of a smartphone/tablet). The image capture device for which the clock 16 provides time information may include some or all of the components of the system 10. The system 10 may include the image capture device for which the clock 16 provides time information.

Time information provided by the clock 16 may characterize the time at which the image capture device operates. The time information provided by the clock 16 may define the time at which the image capture device operates and/or may be used to determine the time at which the image capture device operates. The time at which the image capture device operates may be set based on a default (e.g., default time of the image capture device set by a manufacturer/producer of the image capture device), based on user input (e.g., user input that specifies the time of the image capture device), based on location (e.g., time of the image capture device corresponding to the time of the time zone in which the image capture device is located), based on communication with other device(s) (e.g., time of the image capture device synchronizes with time of a server), and/or based on other information.

The transmitter 17 may refer to equipment used to generate and/or transmit electromagnetic waves carrying information. The transmitter 17 may be part of or separate from a device including the receiver 18. The transmitter 17 may be configured to transmit information via the electromagnetic waves. For example, the transmitter 17 may generate and/or transmit time information of an image capture device and/or other information via the electromagnetic waves. The transmitter 17 may generate and/or transmit electromagnetic waves based on one or more wireless communication technologies, such as WiFi and/or Bluetooth. In some implementations, the time information transmitted by the transmitter 17 may include time of the respective image capture device, an identifier of the respective image capture device, and/or other information.

The receiver 18 may refer to equipment used to receiver and/or convert electromagnetic waves carrying information. The receiver 18 may be part of or separate from a device including the transmitter 17. The receiver 18 may be configured to receive information via the electromagnetic waves. For example, the receiver 18 may receive and/or convert time information of an image capture device and/or other information via the electromagnetic waves. The receiver 18 may receive and/or convert electromagnetic waves based on one or more wireless communication technologies, such as WiFi and/or Bluetooth. In some implementations, the time information received and/or converted by the receiver 16 may include time of the image capture device that transmitted the time information, an identifier of the image capture device that transmitted the time information, and/or other information.

The processor 11 may be configured to provide information processing capabilities in system 10. As such, processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor 11 may be configured to execute one or more machine readable instructions 100 to facilitate synchronization of visual content. Machine readable instructions 100 may include one or more computer program components. Machine readable instructions 100 may include one or more of a reception component 102, a transmission component 104, a capture component 106, a synchronization component 108, and/or other computer program components.

The reception component 102 may be configured to receive time information of other image capture device(s) and/or other information. The reception component 102 may receive time information of other image capture device(s) and/or other information using the receiver 18 and/or other components of the system 10. The reception component 102 may receive time information of other image capture device(s) during operation of a respective image capture device to capture image(s). That is, the reception component 102 of/for an image capture device may receive time information of other image capture device while the image capture device is operating to capture one or more images (e.g., operating to capture an image, multiple images, video frame(s) of a video). Such reception of time information of other image capture devices may enable the system 10 to record time information of other image capture devices while the image capture device is capturing image(s).

The reception component 102 may receive time information of other image capture device(s) during non-operation of the respective image capture device to capture image(s). That is, the reception component 102 of/for an image capture device may receive time information of other image capture device while the image capture device is not operating to capture one or more images (e.g., operating in standby mode, turned on yet not recording images). Such reception of time information of other image capture devices may enable the system 10 to record time information of other image capture devices while the image capture device is not capturing image(s).

The transmission component 104 may be configured to transmit the time information of a respective image capture device and/or other information. The transmission component 104 may transmit time information of the respective image capture device and/or other information using the transmitter 17 and/or other components of the system 10. The transmission component 14 may transmit the time information of the respective image capture device independent of reception of the time information of the other image capture device(s) by the reception component 102. That is, the transmission component 104 of/for an image capture device may transmit time information of the image capture device regardless of whether the reception component 102 of/for the image capture device has received time information of other image capture device(s). Such transmission of time information of the image capture device may enable the system 10 to provide time information of the image capture device without having knowledge of the other image capture device(s). For example, the transmission component 104 of/for an image capture device may broadcast (e.g., one to many broadcast) the time information of the image capture device without determining whether another image capture device is within proximity of the image capture device.

The capture component 106 may be configured to capture a set of images during a capture duration based on the image output signals. The set of images may include one or more images. The image(s) within the set of images may be stored individually as standalone images, stored as a group of images, stored as video frames of a video, and/or other images. The capture component 106 may capture visual content of the set of images during the capture duration based on the image output signals. The visual content may refer to media content that may be consumed as one or more images and/or one or more videos. The visual content of the set of images may refer to content of image(s) that are visible and/or capable of being presented/displayed on a display. For example, the visual content of the images captured by the capture component 106 may include pixels of varying colors, brightness, numbers, groupings, and/or other visible characteristics captured based on the image output signals.

In some implementations, information defining the images captured by the capture component 106 may be stored and/or transferred in a bitstream. Information defining the images may be stored and/or transferred in the bitstream in the order that they are captured. For example, the capture component 106 may capture video frames 101, 102, 103, 104, 105, 106 of a video during a capture duration based on the image output signals. The video frames may be stored and/or transferred in the bitstream as follows: video frame 101, video frame 102, video frame 103, video frame 104, video frame 105, and video frame 106.

The synchronization component 108 may be configured to generate time synchronization information for the set of images based on the time information of the respective image capture device, the time information of the other image capture device(s), and/or other information. Time synchronization information may refer to information which may be used to synchronize images captured by different image capture devices. Time synchronization information may include information that characterizes difference in operating times of different image capture devices.

For example, time synchronization information generated for a set of images captured by an image capture device may include one or more of an identifier of the image capture device, a time of the image capture device (e.g., time at which the capture of the set of images began and/or ended, time at which the image capture device is operating), an identifier of another image capture device, one or more times of the other image capture device received for/by the image capture device, and/or other information.

For example, two image capture devices (image capture device A, image capture device B) may be capturing images defining video frames of videos. The two image capture devices may individually be transmitting its own time information while receiving the time information of the other image capture device. The time synchronization for the set of images captured by the image capture device A may be generated based on the time of the image capture device B (e.g., local time B received by camera A), the identifier of the image capture device B (e.g., camera B ID), and/or other information. As another example, the time synchronization for the set of images captured by the image capture device A may be generated based on a difference between the time of the image capture device A (e.g., local time A) and the time of the image capture device B (e.g., local time B, the identifier of the image capture device B (e.g., camera B ID), and/or other information.

In some implementations, some or all of the time synchronization information may be stored within one or more storage. For example, referring to the example of two image capture devices (image capture device A, image capture device B) capturing images defining video frames of videos, a start storage of the image capture device A may include information on the time at which the image capture device A is operating (local time A), the identifier of the image capture device A (e.g., camera A ID), and/or other information. That is, the start storage of the image capture device A may include information defining the following: local time A; camera A ID. Similarly, the start storage of the image capture device B may include information defining the following: local time B; camera B ID.

A streaming storage of the image capture device A may include information defining video frames of the video (e.g., video A) being captured by the image capture device A, information on the identifier of the image capture device B (e.g., camera B ID), and information characterizing time of the image capture device B received by the image capture device A (e.g., local time B).

For example, the image capture device A may capture two video frames (e.g., video frames 101, 102), receive a local time and identifier of the image capture device B (e.g., camera B ID-local time B), capture three video frames (e.g., video frames 103, 104, 105), and then receive a local time and identifier of the image capture device B (e.g., camera B ID-local time B). The information captured and received by the image capture device A may be stored in the order in which information was captured such that the streaming storage of the image capture device A includes information defining the following in order: video frame 101, video frame 102, camera B ID-local time B, video frame 103, video frame 104, video frame 105, and camera B ID-local time B. Alternative or in addition, the streaming storage of the image capture device A may include information defining the following in order: video frame 101, video frame 102, camera B ID-delta of local time A and local time B, video frame 103, video frame 104, video frame 105, and camera B ID-delta of local time A and local time B. That is, rather than storing the local time of the other image capture device, the different between the local times of the image capture devices may be stored.

Similarly, the image capture device B may capture four video frames (e.g., video frames 201, 202, 203, 204), receive a local time and identifier of the image capture device A (e.g., camera A ID-local time A), capture one video frame (e.g., video frame 205), and then receive a local time and identifier of the image capture device A (e.g., camera A ID-local time A). The information captured and received by the image capture device B may be stored in the order in which information was captured such that the streaming storage of the image capture device B includes information defining the following in order: video frame 201, video frame 202, video frame 203, video frame 204, camera A ID-local time A, video frame 205, and camera A ID-local time A. Alternative or in addition, the streaming storage of the image capture device B may include information defining the following in order: video frame 201, video frame 202, video frame 203, video frame 204, camera A ID-delta of local time B and local time A, video frame 205, and camera A ID-delta of local time B and local time A. That is, rather than storing the local time of the other image capture device, the different between the local times of the image capture devices may be stored. Other time synchronization information and storage of time synchronization information are contemplated.

In some implementations, time synchronization information may be stored within the same container as the set of images. For example, the set of images may be form video frames of a video, and the time synchronization information for the set of images may be stored within a metadata track of the video. In some implementations, time synchronization information may be stored within a file/track specifically associated with time. For example, time synchronization information may be stored within a timecode track of the set of images/video including the set of images.

Figure 3A:
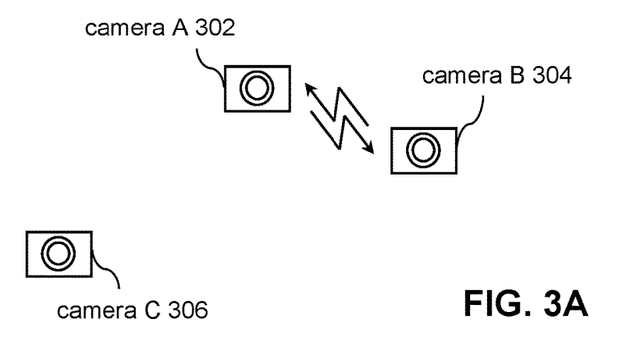
FIG. 3A illustrates an example scenario for synchronizing visual content.
Figure 3B:
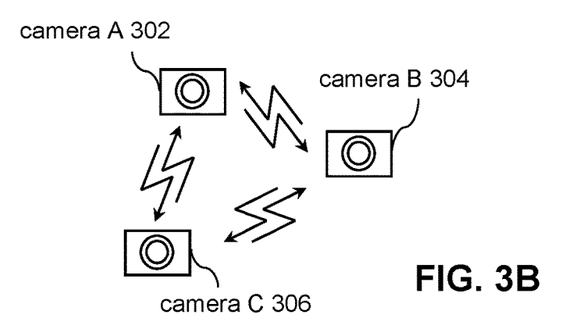
FIG. 3B illustrates an example scenario for synchronizing visual content.
Figure 3C:
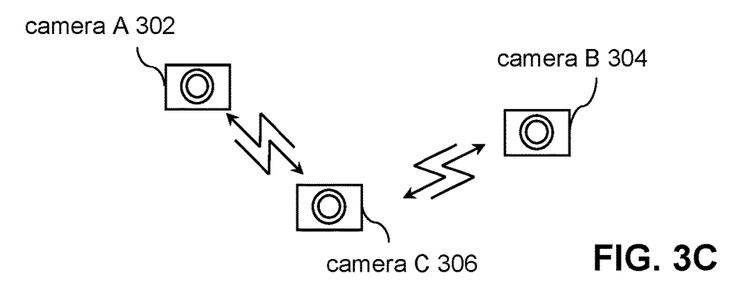
FIG. 3C illustrates an example scenario for synchronizing visual content.

FIGS. 3A-3C illustrate example scenarios for synchronizing visual content. The scenarios illustrated in FIGS. 3A-3C may include a camera A 302, a camera B 304, a camera C 306, and/or other cameras/image capture devices.

The scenarios illustrated in FIGS. 3A-3C may be separate from each other or related to each other. For example, the scenarios illustrated in FIGS. 3A-3C may show relative positioning of the cameras 302, 304, 306 at three separate locations and/or three separate instances of capturing visual content. The scenarios illustrated in FIGS. 3A-3C may show relative positioning of the cameras 302, 304, 306 at a single location and/or a single instance. For example, the cameras 302, 304, 306 may be capturing videos near each, with the cameras 302, 304, 306 initially positioned as shown in FIG. 3A, then changed to the positions shown in FIG. 3B, and then changed to the positions shown in FIG. 3C.

One or more of the cameras 302, 304, 306 may individually include one or more of the components of the system 10 (shown in FIG. 1). For example, one or more of the cameras 302, 304, 306 may individually include one or more of an optical element, an image sensor, a clock, a transmitter, a receiver, a processor, computer program components, and/or other components. One or more of the cameras 302, 304, 306 may perform some or all of the functions of the system 10.

For example, the camera A 302 may capture a first set of images during a first capture duration. The camera B 304 may capture a second set of images during a second capture duration. The camera C 306 may capture a third set of images during a third capture duration. Two or more of the capture durations of the cameras 302, 304, 306 may be the same or different. For example, the camera A 302 and the camera B 304 may capture sets of images during the same duration of time or during different durations of time. Two or more of the capture durations of the cameras 302, 304, 306 may overlap with each other. For example, the first capture duration of the camera A 302 and the second capture duration of the camera B 304 may overlap with each other.

The cameras 302, 304, 306 may individually transmit its time information using its transmitter. The cameras 302, 304, 306 may individually receive time information of other cameras using its receiver. The transmission of time information by the cameras 302, 304, 306 may be independent of reception of the time information of other cameras. For example, the camera A 302 may transmit its time information regardless of whether the camera A 302 has receive time information of the camera B 304 or the camera C 306. The transmission of the time information by the cameras 302, 304, 306 may not be directed to any particular cameras. That is, the cameras 302, 304, 306 may broadcast its time information to all cameras within range of the broadcast. Whether the cameras 302, 304, 306 receive time information of other camera(s) may depend on geographic proximity of the cameras 302, 304, 306.

Referring to FIG. 3A, the cameras 302, 304 may individually transmit its time information and receive other camera's time information based on the cameras 302, 304 being within range of communication. The camera C 306 may not be within range of communication of the cameras 302, 304. The camera C 306 may transmit its time information, but the cameras 302, 304 may not receive the time information of the camera C 306. The camera C 306 may not receive the time information of the cameras 302, 304. Referring to FIG. 3B, the cameras 302, 304, 306 may individually transmit its time information and receive other camera's time information based on the cameras 302, 304, 306 being within range of communication. Referring to FIG. 3C, the camera C 306 may be within range of communication of the cameras 302, 304. The cameras 302, 304 may not be within range of communication. The cameras 302, 306 may individually transmit its time information and receive other camera's time information. The cameras 304, 306 may individually transmit its time information and receive other camera's time information. The cameras 302, 304 may not receive other camera's time information.

In some implementations, transmission of the time information by different image capture devices may be staggered. For example, the camera 302 may transmits its time information at a first time and the camera 304 may transmit its time information at a second time different from the first time. The staggered transmission of time information by different image capture devices may reduce conflict in transmission and/or reception of time information by the image capture devices.

The cameras 302, 304, 306 may individually generate time synchronization information for the respective sets of images captured by the cameras 302, 304, 306 based on the time information of the respective cameras 302, 304, 306, the time information of the other camera(s) received by the cameras 302, 304, 306, and/or other information. For example, referring to FIG. 3A, the camera A 302 may generate first time synchronization information for the first set of images captured by the camera A 302 based on the time information of the camera A 302 and the received time information of the camera B 304, and/or other information. The camera B 304 may generate second time synchronization information for the second set of images captured by the camera B 304 based on the time information of the camera B 304 and the received time information of the camera A 302, and/or other information.

Referring to FIG. 3B, the camera A 302 may generate first time synchronization information for the first set of images captured by the camera A 302 based on the time information of the camera A 302, the received time information of the camera B 304, the received time information of the camera C 306, and/or other information. The camera B 304 may generate second time synchronization information for the second set of images captured by the camera B 304 based on the time information of the camera B 304, the received time information of the camera A 302, the received time information of the camera C 306, and/or other information. The camera C 306 may generate third time synchronization information for the third set of images captured by the camera C 306 based on the time information of the camera C 306, the received time information of the camera A 302, the received time information of the camera B 304, and/or other information.

Referring to FIG. 3C, the camera A 302 may generate first time synchronization information for the first set of images captured by the camera A 302 based on the time information of the camera A 302, the received time information of the camera C 306, and/or other information. The camera B 304 may generate second time synchronization information for the second set of images captured by the camera B 304 based on the time information of the camera B 304, the received time information of the camera C 306, and/or other information. The camera C 306 may generate third time synchronization information for the third set of images captured by the camera C 306 based on the time information of the camera C 306, the received time information of the camera A 302, the received time information of the camera B 304, and/or other information.

The cameras 302, 304, 306 may store individually time information from received from other cameras. For example, after a period of time of capturing videos, the cameras 302, 304, 306 may individually include image information defining captured images, audio information defining captured audio, and time information of other cameras. The image information, the audio information, and the time information may be stored at or based on the time they were captured, generated, and/or received. For example, the camera A 302 may store image information and audio information during video capture at the moment or in the order that the image information and the audio information is captured/generated by the camera A 302. The camera A 302 may store time information of the cameras 304, 306 at the moment or in the order that the time information is received by the camera A 302.

Multiple images from the sets of images captured by different image capture devices may be time-synchronized based on at least one of the generated time-synchronization information. Time-synchronization of images may refer to ordering and/or arrangement of images based on the time of capture. Time-synchronization of images may include determination of which images were captured at the same time, which images were captured before other images, and/or which images were captured after other images. Time-synchronization of images may include determination of time relationships between images that were captured by different image capture devices.

For example, multiple images from the sets of images captured by the cameras 302, 304, 306 may be time-synchronized based on at least one of the time-synchronization information generated by the cameras 302, 304, 306. Referring to FIG. 3A, multiple images from the first set of images captured by the camera A 302 and the second set of images captured by the camera B 304 may be time-synchronized based the first time synchronization generated by the camera A 302, the second time synchronization information generated by the camera B 304, and/or other information. Referring to FIG. 3B, multiple images from the first set of images captured by the camera A 302, the second set of images captured by the camera B 304, and/or the third set of images captured by the camera C 306 may be time-synchronized based the first time synchronization generated by the camera A 302, the second time synchronization information generated by the camera B 304, the third time synchronization information generated by the camera C 306, and/or other information.

Referring to FIG. 3C, the first time synchronization information generated by the camera A 302 may be used to time-synchronize multiple images from the first set of images captured by the camera A 302 and the third set of images captured by the camera C 306. The second time synchronization information generated by the camera B 304 may be used to time-synchronize multiple images from the second set of images captured by the camera B 304 and the third set of images captured by the camera C 306. The third time synchronization information generated by the camera C 306 may be used to time-synchronize multiple images from the first set of images captured by the camera A 302, the second set of images captured by the camera B 304, and the third set of images captured by the camera C 306.

The generated time-synchronization information may enable post-capture time-synchronization of multiple images from sets of images captured by different image capture devices. That is, rather than time-synchronizing images as they are captured (live time-synchronization), the images may be time-synchronized after the images have been captured and stored. The generated time-synchronization information may enable time-synchronization of images by one or more images capture devices and/or other devices. For example, referring to FIG. 3C, multiple images from the sets of images captured by the camera 302, 304, 306 may be time-synchronized by the camera C 306. Alternatively or in addition, the generated time-synchronization information may be provided to another device (e.g., server), and the multiple images from the sets of images captured by the camera 302, 304, 306 may be time-synchronized by the other device.

In some implementations, time-synchronized images may be used to generate a video edit including images captured by different image capture devices. A video edit may include a particular arrangement and/or manipulation of some or all of the images captured by different image capture devices. For example, a video edit may include particular images captured by different image capture devices to provide a summary of the images captured by the different image capture devices. As another example, a video edit may include images of a subject, an activity, an event, and/or other thing of interest captured by the different image capture devices. The video edit may be generated by one of the image capture devices and/or another device (e.g., server) after the capture of the sets of images. For example, images captured by different image capture devices and time synchronization information generated by different image capture devices may be uploaded to a server. The time synchronization information may enable time-accurate understanding of how different images/groups of images are related to each other in time, and enable cloud-based editing of images/videos captured by different image capture devices.

Figure 4:
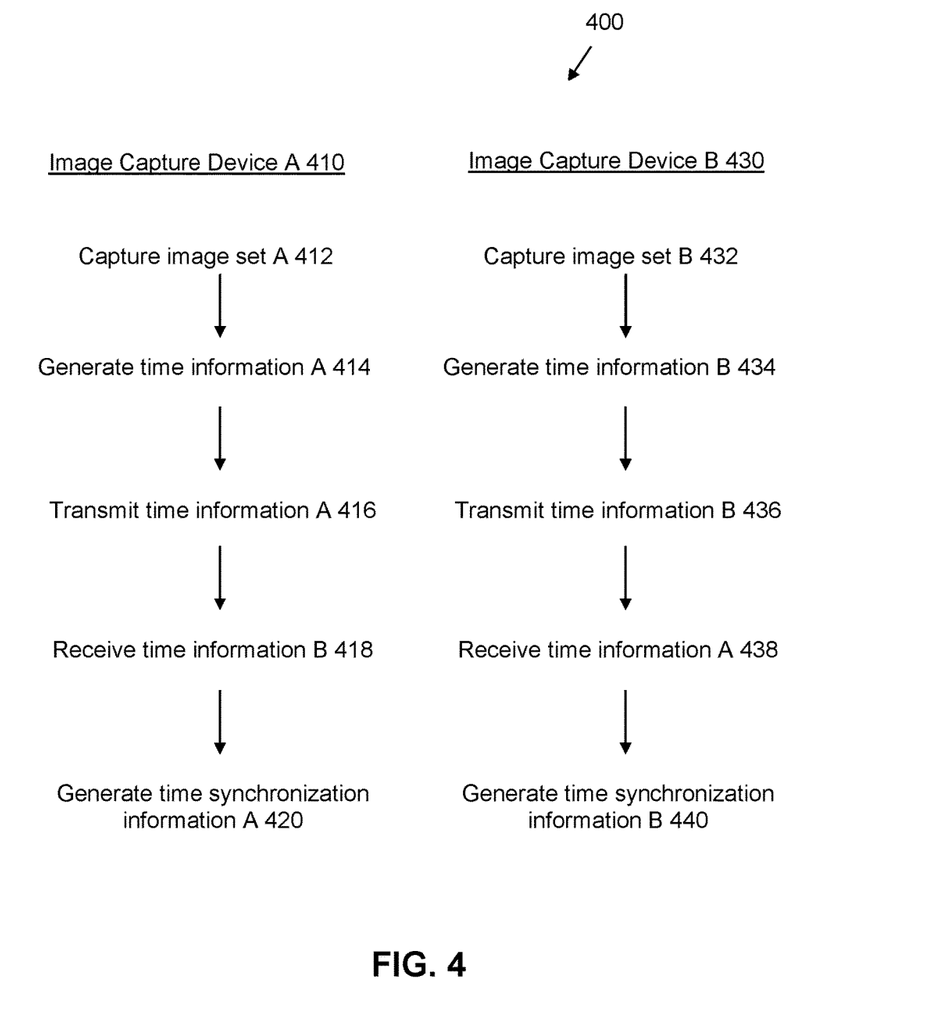
FIG. 4 illustrates an example flow for synchronizing visual content.

FIG. 4 illustrates an example flow 400 for synchronizing visual content. The visual content (e.g., content of images, videos) may be captured by an image capture device A 410 and an image capture device B 430. For example, at step 412, the image capture device A 410 may capture an image set A. At step 432, the image capture device B 430 may capture an image set B. At step 414, the image capture device A 410 may generate time information A of the image capture device A. At step 434, the image capture device B 430 may generate time information B of the image capture device B. At step 416, the image capture device A 410 may transmit the time information A. At step 436, the image capture device B 430 may transmit the time information B. At step 418, the image capture device A 410 may receive the time information B. At step 438, the image capture device B 430 may receive the time information A. At step 420, the image capture device A 410 may generate time synchronization information A for the image set A. The time synchronization information A may be generated based on the time information A, the received time information B, and/or other information. At step 440, the image capture device B 413 may generate time synchronization information B for the image set B. The time synchronization information B may be generated based on the time information B, the received time information A, and/or other information.

Figure 5:
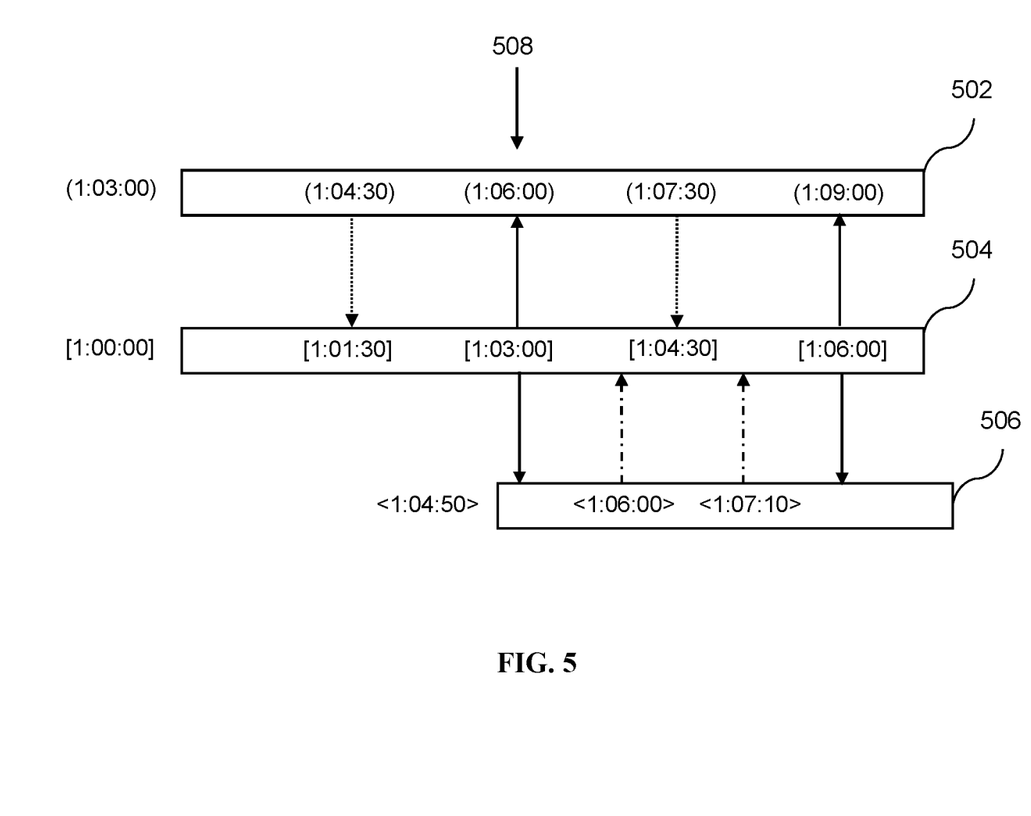
FIG. 5 illustrates example exchange of time information during capture of visual content

FIG. 5 illustrates example exchange of time information during capture of visual content. A box 502 may represent a capture duration during which an image capture device A captures images, such as video frames of a video A. A box 504 may represent a capture duration during which an image capture device B captures images, such as video frames of a video B. A box 506 may represent a capture duration during which an image capture device C captures images, such as video frames of a video C.

The capture duration for the video A (represented by the box 502) may be the same as the capture duration for the video B (represented by the box 504). The capture duration for the video A may start and end at the same time as the capture duration for the video B. The capture duration for the video C (represented by the box 506) may be different from the capture duration for videos A and B. The capture duration for the video C may start and end at different times from the capture durations for the videos A and B. The length of the capture duration for the video C may be shorter than the lengths of the capture durations for the videos A and B.

The time of the image capture devices A, B, and C may not be synchronized. For example, the time of the image capture device A may be three minutes later than the time of the image capture device B. The time of the image capture device C may be two minutes later than the time of the image capture device B. For instance, when the clock of the image capture device A is at 1:03:00, the clock of the image capture device B may be at 1:00:00, and the clock of the image capture device C may be at 1:02:00. The different times at which the clocks of the image capture devices A, B, and C operate may result in images captured by the image capture devices A, B, and C at the same moment being associated with different times. For example, an images captured by the image capture device A, B, and C at a moment 508 may be associated with times as follows: the image captured by the image capture device A may be associated with time of 1:06:00; the image captured by the image capture device A may be associated with time of 1:03:00; the image captured by the image capture device A may be associated with time of 1:05:00. Manually synchronizing the images captured by the image capture devices A, B, and C may be difficult and/or time consuming.

The images captured by the image capture devices A, B, and C may be automatically time-synchronized based on exchange of time information of the image capture devices A, B, and C. For example, as shown in FIG. 5, the time information of the image capture device A may be transmitted to the image capture device B at times 1:04:30 and 1:07:30 of the image capture device A (once every three minutes). The time information of the image capture device B may be transmitted to the image capture device A and to the image capture device B at times 1:03:00 and 1:06:00 of the image capture device B (once every three minutes). The time information of the image capture device C may be transmitted to the image capture device B at times 1:06:00 and 1:07:10 of the image capture device A (e.g., once every minute and ten seconds). The transmission of time information may occur at other regular and/or irregular time intervals. For example, the transmission of time information may occur at every second, with the transmission of time information by different image capture devices being staggered in time.

The transmission of time information may include transmission of information on the operating times of the image capture devices, information on the identifiers of the image capture devices, and/or information. The identifiers of the image capture devices and the reported times of the image capture devices may be used determine time relationships between the operating times of the image capture devices. For example, identifiers of the image capture devices and the reported times of the image capture devices may be used determine that the time of the image capture device A is three minutes (offset of three minutes) later than the time of the image capture device B, and that the time of the image capture device C may be two minutes (offset of two minutes) later than the time of the image capture device B.

The identifiers of the image capture devices and the reported times of the image capture devices may be used to time-synchronize images captured by the image capture devices. For example, the times associated with the images captured by the image capture devices A, B, C may be adjusted to a standard operating time to order the images based on time of capture.

Longer duration of overlap between capture durations of different image capture devices and/or longer duration of overlap in exchange of time information between different image capture devices may provide for more accurate and/or more precise time-synchronization of images. Longer duration of overlap may enable time-synchronization of images to account for drift in one or more clocks.

In some implementations, an offset between the times of multiple image capture devices may be determined based on time synchronization information generated by the multiple image capture devices and/or other information. That is, the time of other image capture devices received by different image capture devices may be used to determine the offset between the times of the different image capture devices.

In some implementations, an offset between the times of multiple image capture devices may be determined based on an average of multiple offsets indicated by multiple time synchronization information. For example, an image capture device A and an image capture device B may be exchanging their time information. The time synchronization information generated by the image capture device A may indicate that the a video captured by the image capture device A is fifteen seconds ahead of a video captured by the image capture device B. The time synchronization information generated by the image capture device B may indicate that the video captured by the image capture device B is fourteen seconds behind the video captured by the image capture device A. That is, the time synchronization information generated by the image capture device A may indicate an offset of fifteen seconds while the time synchronization information generated by the image capture device B may indicate an offset of fourteen seconds. Such difference in offsets may be a report of propagation delays in exchange of time information. Averaging the offsets indicated by the different time synchronization information (e.g., an offset of 14.5 seconds) may result in a more accurate timing relationship between the videos captured by the different image capture devices.

In some implementations, visual content may include spherical visual content. Spherical visual content may refer to image/video capture of multiple views from at least one location. Spherical visual content may include a full spherical visual capture (360 degrees of capture) or a partial spherical visual capture (less than 360 degrees of capture). Spherical visual content may be captured through the use of one or more cameras/image sensors to capture images/videos from a location. For spherical visual content captured using multiple cameras/image sensors, multiple images/videos captured by the multiple cameras/image sensors may be stitched together to form the spherical visual content.

Spherical visual content may have been captured at one or more locations. For example, spherical visual content may have been captured from a stationary position (e.g., a seat in a stadium). Spherical visual content may have been captured from a moving position (e.g., a moving bike). Spherical visual content may include image/video capture from a path taken by the capturing device(s) in the moving position. For example, spherical visual content may include video capture from a person walking around in a music festival.

While the present disclosure may be directed to visual content, one or more other implementations of the system may be configured for other types media content. Other types of media content may include one or more of audio content (e.g., music, podcasts, audio books, and/or other audio content), multimedia presentations, images, slideshows, visual content (one or more images and/or videos), and/or other media content.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

Although the processor 11, the electronic storage 13, the image sensor 15, the clock 16, the transmitter 17, and the receiver 18 are shown to be connected to the interface 12 in FIG. 1, any communication medium may be used to facilitate interaction between any components of system 10. One or more components of system 10 may communicate with each other through hard-wired communication, wireless communication, or both. For example, one or more components of system 10 may communicate with each other through a network. For example, processor 11 may wirelessly communicate with electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although processor 11 is shown in FIG. 1 as a single entity, this is for illustrative purposes only. In some implementations, processor 11 may comprise a plurality of processing units. These processing units may be physically located within the same device, or processor 11 may represent processing functionality of a plurality of devices operating in coordination. Processor 11 may be configured to execute one or more components by software; hardware; firmware; some combination of software, hardware, and/or firmware; and/or other mechanisms for configuring processing capabilities on processor 11.

It should be appreciated that although computer components are illustrated in FIG. 1 as being co-located within a single processing unit, in implementations in which processor 11 comprises multiple processing units, one or more of computer program components may be located remotely from the other computer program components.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of electronic storage 13 may be provided integrally (i.e., substantially non-removable) with one or more components of system 10 and/or removable storage that is connectable to one or more components of system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within system 10, or the electronic storage 13 may be provided integrally with one or more other components of system 10 (e.g., processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
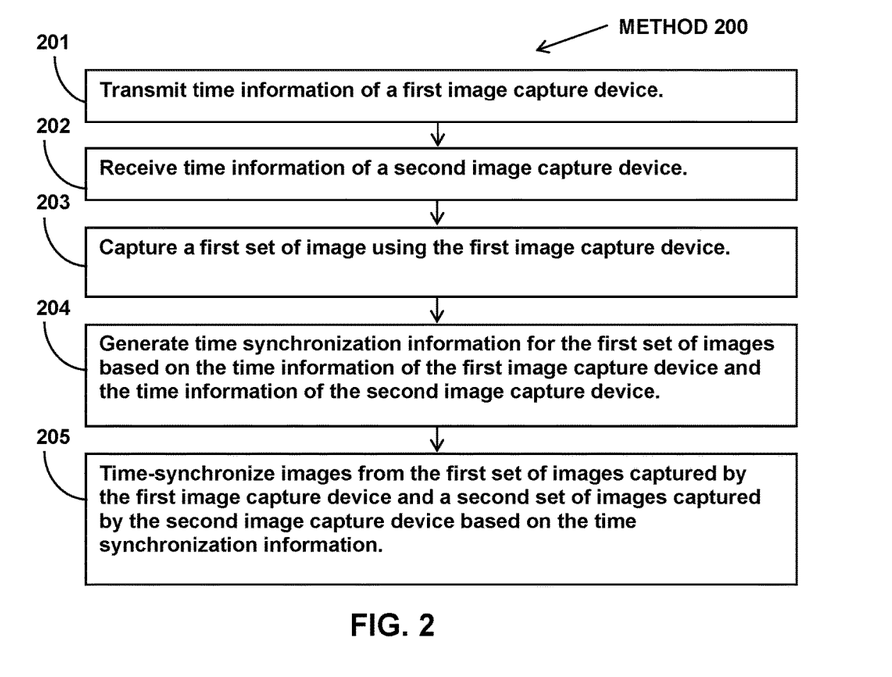
FIG. 2 illustrates a method for synchronizing visual content.

FIG. 2 illustrates method 200 for sharing captured visual content. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operation of method 200.

Referring to FIG. 2 and method 200, at operation 201, time information of a first image capture device may be transmitted. Transmission of the time information of the first image capture device may be independent of reception of time information of a second image capture device. In some implementation, operation 201 may be performed by a processor component the same as or similar to the transmission component 104 (Shown in FIG. 1 and described herein).

At operation 202, time information of the second image capture device may be received. In some implementations, operation 202 may be performed by a processor component the same as or similar to the reception component 102 (Shown in FIG. 1 and described herein).

At operation 203, a first set of image may be captured using the first image capture device. The first set of images may be captured during a capture duration. In some implementations, operation 203 may be performed by a processor component the same as or similar to the capture component 106 (Shown in FIG. 1 and described herein).

At operation 204, time synchronization information for the first set of images may be generated based on the time information of the first image capture device and the time information of the second image capture device. In some implementations, operation 204 may be performed by a processor component the same as or similar to the synchronization component 108 (Shown in FIG. 1 and described herein).

At operation 205, images from the first set of images captured by the first image capture device and a second set of images captured by the second image capture device may be time-synchronized based on the time synchronization information. In some implementations, operation 205 may be performed by a processor component the same as or similar to the synchronization component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system that synchronizes visual content, the system comprising:
    multiple image capture devices, individual ones of the multiple image capture devices including:
        an optical element configured to guide light within a field of view to an image sensor;
        the image sensor configured to generate image output signals based on light that becomes incident thereon, the image output signals conveying image information that defines images;
        a clock configured to provide time information of a respective image capture device;
        a transmitter configured to transmit first information;
        a receiver configured to receive second information; and
        one or more processors configured by machine-readable instructions to:
            receive time information of one or more other image capture devices using the receiver;
            transmit the time information of the respective image capture device using the transmitter, wherein transmission of the time information of the respective image capture device is independent of reception of the time information of the one or more other image capture devices;
            capture a set of images during a capture duration based on the image output signals; and
            generate time synchronization information for the set of images based on the time information of the respective image capture device and the time information of the one or more other image capture devices;
    wherein:
        the multiple image capture devices include a first image capture device and a second image capture device;
        captured sets of images include a first set of images captured by the first image capture device during a first capture duration and a second set of images captured by the second image capture device during a second capture duration;
        first time information of the first image capture device includes a time of the first image capture device and an identifier of the first image capture device, and second time information of the second image capture device includes a time of the second image capture device and an identifier of the second image capture device;
        generated time-synchronization information includes first time synchronization information generated by the first image capture device and second time synchronization information generated by the second image capture device, wherein an offset between the time of the first image capture device and the time of the second image capture device is determined based on the first time synchronization information and the second time synchronization information; and
        multiple images from the captured sets of images are time-synchronized based on at least one of the generated time-synchronization information.

2. The system of claim 1, wherein the first capture duration for the first set of images overlaps with the second capture duration for the second set of images.

3. The system of claim 2, wherein the first capture duration for the first set of images is different from the second capture duration for the second set of images.

4. The system of claim 1, wherein time-synchronized images are used to generate a video edit including images captured by different image capture devices, the video edit generated by the first image capture device or a server after the capture of the sets of images.

5. The system of claim 1, wherein transmission of the time information by the multiple image capture devices are staggered such that the first image capture device transmits the first time information of the first image capture device at a first time and the second image capture device transmits the second time information of the second image capture device at a second time different from the first time.

6. The system of claim 1, wherein the first time synchronization information is generated based on the time of the second image capture device and the identifier of the second image capture device.

7. The system of claim 1, wherein the first time synchronization information is generated based on a difference between the time of the first image capture device and the time of the second image capture device, and the identifier of the second image capture device.

8. The system of claim 1, wherein the offset between the time of the first image capture device and the time of the second image capture device is determined based on an average of a first offset indicated by the first time synchronization information and a second offset indicated by the second time synchronization information.

9. The system of claim 1, wherein:
    the multiple image capture devices further include a third image capture device;
    the captured sets of images further include a third set of images captured by the third image capture device; and
    the generated time-synchronization information further includes third time synchronization information generated by the third image capture device.

10. A method for synchronizing visual content, the method performed by an image capture device comprising (1) an optical element configured to guide light within a field of view to an image sensor, (2) the image sensor configured to generate image output signals based on light that becomes incident thereon, the image output signals conveying image information that defines images, (3) a clock configured to provide time information of the image capture device, (4) a transmitter configured to transmit first information, and (5) a receiver configured to receive second information, the method comprising:

receiving time information of another image capture device using the receiver, the time information of the other image capture device including a time of the other image capture device and an identifier of the other image capture device;

transmitting the time information of the image capture device using the transmitter, the time information of the image capture device including a time of the image capture device and an identifier of the image capture device, wherein transmission of the time information of the image capture device is independent of reception of the time information of the other image capture device;

capturing a first set of images during a first capture duration based on the image output signals; and     generating first time synchronization information for the first set of images based on the time information of the image capture device and the time information of the other image capture device;

wherein:

the other image capture device captures a second set of images during a second capture duration;

the other image capture device generates second time synchronization information;

an offset between the time of the image capture device and the time of the other image capture device is determined based on the first time synchronization information and the second time synchronization information; and         multiple images from the first set of images and the second set of images are time-synchronized based on at least one of the first time synchronization information and the second time synchronization information.

11. The method of claim 10, wherein the first capture duration for the first set of images overlaps with the second capture duration for the second set of images.

12. The method of claim 11, wherein the first capture duration for the first set of images is different from the second capture duration for the second set of images.

13. The method of claim 10, wherein time-synchronized images are used to generate a video edit including images captured by the image capture device and the other image capture device, the video edit generated by the image capture device or a server after the capture of the first set of images and the second set of images.

14. The method of claim 10, wherein the first time synchronization information is generated based on the time of the other image capture device and the identifier of the other image capture device.

15. The method of claim 10, wherein the offset between the time of the image capture device and the time of the other image capture device is determined based on an average of a first offset indicated by the first time synchronization information and a second offset indicated by the second time synchronization information.

* * * * *